United States Patent
Byron et al.

(10) Patent No.: US 9,721,008 B1
(45) Date of Patent: Aug. 1, 2017

(54) RECIPE GENERATION UTILIZING NATURAL LANGUAGE PROCESSING

(71) Applicant: INTERNATIONAL BUSINESS MACHINES CORPORATION, Armonk, NY (US)

(72) Inventors: Donna K. Byron, Petersham, MA (US); Florian Pinel, New York, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/177,526

(22) Filed: Jun. 9, 2016

(51) Int. Cl.
*G06F 17/27* (2006.01)
*G06F 17/30* (2006.01)
*G06F 3/0484* (2013.01)
*G10L 15/00* (2013.01)
*G10L 15/18* (2013.01)

(52) U.S. Cl.
CPC .... *G06F 17/30734* (2013.01); *G06F 3/04842* (2013.01); *G06F 17/277* (2013.01); *G06F 17/2725* (2013.01); *G06F 17/30699* (2013.01)

(58) Field of Classification Search
CPC ........... G06F 17/30734; G06F 17/2725; G06F 17/30699; G06F 17/277; G06F 3/04842
USPC .................... 704/9, 232, 257, 259
See application file for complete search history.

(56) References Cited

U.S. PATENT DOCUMENTS

| | | | |
|---|---|---|---|
| 6,872,077 B2 | 3/2005 | Yeager | |
| 7,249,116 B2 | 7/2007 | Fiske | |
| 8,335,796 B2 | 12/2012 | Maeda et al. | |
| 2012/0136864 A1 | 5/2012 | Ochtel | |
| 2014/0089299 A1 | 3/2014 | Kamei et al. | |
| 2014/0324607 A1 | 10/2014 | Frehn et al. | |
| 2015/0220592 A1 | 8/2015 | Robberechts et al. | |
| 2015/0220624 A1 | 8/2015 | Bhatt et al. | |

FOREIGN PATENT DOCUMENTS

| | | |
|---|---|---|
| CN | 103577671 A | 2/2014 |
| JP | 2002230176 A | 8/2002 |

OTHER PUBLICATIONS

Mell et al., "The NIST Definition of Cloud Computing," National Institute of Standards and Technology, Sep. 2011, p. 1-3, Special Publication 800-145.

MSU Library, "Feeding America: The Historic American Cookbook Project," MSU Libraries Digital Collections, 2001, p. 1, Michigan State University, http://digital.lib.msu.edu/projects/cookbooks/, Accessed on Mar. 17, 2016.

*Primary Examiner* — Thierry L Pham
(74) *Attorney, Agent, or Firm* — Robert J. Shatto

(57) ABSTRACT

A method for generating a recipe from a literary work. The method may include ingesting a plurality of recipe content using a plurality of natural language processing (NLP) technology. The method may further include creating an ingredient ontology based on the ingested plurality of recipe content. The method may further include ingesting a plurality of content of the literary work using the plurality of NLP technology. The method may further include generating a knowledge graph based on the ingested literary work. The method may further include calculating a relatedness score based on the number of edges between the first plurality of nodes and the second plurality of nodes. The method may further include generating a plurality of recipes based on the calculated relatedness score satisfying a predetermined threshold.

17 Claims, 7 Drawing Sheets

RECIPE GENERATION UTILIZING NATURAL LANGUAGE PROCESSING

BACKGROUND

The present disclosure relates generally to the field of natural language processing, and, more particularly, to using natural language processing to generate recipes based on ingesting content.

As a field of computer science, natural language processing tends to focus on the interactions between computer systems and human languages. Many modern natural language processing algorithms are derived based on machine learning and rely heavily on statistical inferences. By analyzing a large set of real-world examples of natural language usage, a computer system may be able to glean sets of rules that guide the machine through future analysis of natural language passages.

SUMMARY

According to one exemplary embodiment, a method for generating a recipe from a literary work is provided. A method for generating a recipe from a literary work. The method may include ingesting a plurality of recipe content using a plurality of natural language processing (NLP) technology. The method may further include creating an ingredient ontology based on the ingested plurality of recipe content. The method may further include ingesting a plurality of content of the literary work using the plurality of NLP technology. The method may further include generating a knowledge graph based on the ingested literary work. The knowledge graph includes a first plurality of nodes representing a first plurality of concepts and a second plurality of nodes representing a second plurality of concepts. Edges between the first plurality of nodes and the second plurality of nodes represent links between the first plurality of concepts and the second plurality of concepts. The first plurality of concepts is a plurality of food-time-place-character combinations and the second plurality of concepts is a first plurality of ingredients. The method may further include calculating a relatedness score based on the number of edges between the first plurality of nodes and the second plurality of nodes. The method may further include generating a plurality of recipes based on the calculated relatedness score satisfying a predetermined threshold.

According to another exemplary embodiment, a computer system for generating a recipe from a literary work is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include ingesting a plurality of recipe content using a plurality of natural language processing (NLP) technology. The method may further include creating an ingredient ontology based on the ingested plurality of recipe content. The method may further include ingesting a plurality of content of the literary work using the plurality of NLP technology. The method may further include generating a knowledge graph based on the ingested literary work. The knowledge graph includes a first plurality of nodes representing a first plurality of concepts and a second plurality of nodes representing a second plurality of concepts. Edges between the first plurality of nodes and the second plurality of nodes represent links between the first plurality of concepts and the second plurality of concepts. The first plurality of concepts is a plurality of food-time-place-character combinations and the second plurality of concepts is a first plurality of ingredients. The method may further include calculating a relatedness score based on the number of edges between the first plurality of nodes and the second plurality of nodes. The method may further include generating a plurality of recipes based on the calculated relatedness score satisfying a predetermined threshold.

According to yet another exemplary embodiment, a computer program product for generating a recipe from a literary work is provided. The computer program product may include one or more computer-readable storage devices and program instructions stored on at least one of the one or more tangible storage devices, the program instructions executable by a processor. The computer program product may include program instructions to ingest a plurality of recipe content using a plurality of natural language processing (NLP) technology. The computer program product may further include program instructions to create an ingredient ontology based on the ingested plurality of recipe content. The computer program product may further include program instructions to ingest a plurality of content of the literary work using the plurality of NLP technology. The computer program product may further include program instructions to generate a knowledge graph based on the ingested literary work. The knowledge graph includes a first plurality of nodes representing a first plurality of concepts and a second plurality of nodes representing a second plurality of concepts. Edges between the first plurality of nodes and the second plurality of nodes represent links between the first plurality of concepts and the second plurality of concepts. The first plurality of concepts is a plurality of food-time-place-character combinations and the second plurality of concepts is a first plurality of ingredients. The computer program product may further include program instructions to calculate a relatedness score based on the number of edges between the first plurality of nodes and the second plurality of nodes. The computer program product may further include program instructions to generate a plurality of recipes based on the calculated relatedness score satisfying a predetermined threshold.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
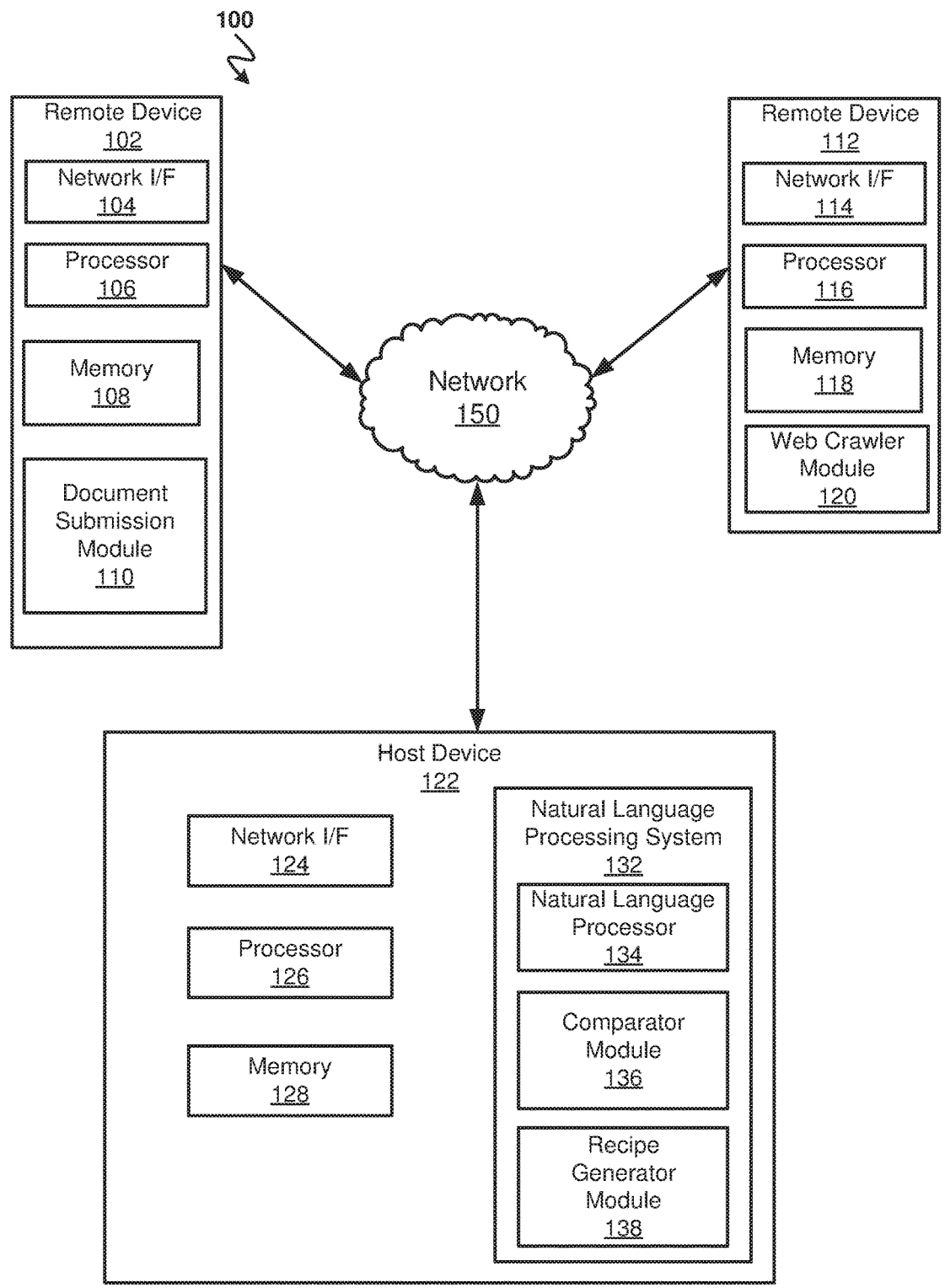
FIG. 1 illustrates an example block diagram of a computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Currently, there is a growing interest in re-creating meals mentioned in a literary work, such as novels, journal articles, or comics. For example, creating a meal that a main character, such as Harry Potter® (Harry Potter and all Harry Potter-based trademarks and logos (such as, Hermione Granger® and Diagon Alley®) are trademarks or registered trademarks of Warner Bros. Entertainment Inc. and/or its affiliates), in a literary work would eat or drink, such as pumpkin juice. The growing interest in re-creating meals remains so far a manual task. A user may have to read the literary work, write down food references, and then create a dish or a meal accordingly. Meals mentioned within a literary work may not be complete recipes but merely minimally described and underspecified with only a dish type and a few ingredients. Also, works of fiction (e.g., the Harry Potter® series of books) may not match any existing recipe. For example, dragon stew from the Harry Potter® book series may not match a well-known recipe, thus the meal would have to be made from scratch.

Therefore, it may be advantageous to, among other things, provide a way to generate a recipe (e.g., ingredients and cooking instructions) of a meal mentioned in a literary work according to a relationship between a user and a corpus of recipes.

The following described exemplary embodiments provide a system, method, and program product for generating recipes by ingesting a literary work and recipes. As such, the present embodiment has the capacity to improve the technical field of natural language processing by ingesting content from a user submitted literary work to generate a recipe based on a meal or associated with a character from the literary work. More specifically, the present embodiment has the capacity of generating a detailed recipe that includes ingredients and cooking instructions so that a user may re-create a meal mentioned in a literary work.

Creating themed foods (e.g., foods inspired by the Harry Potter® book series) based on literary works is becoming commonplace among fans. Literary works may often refer to foods and describe the foods in detail. Despite the fictional nature of the described foods, the ingredients used to create a recipe for the fictional food may be real. Described foods may be based on other features of the literary work besides ingredients, such as time period, geography, or personality traits of the characters. The features of the literary work besides ingredients, such as time period, geography, or personality traits of the characters, may be referred to as a food-time-place-character combination. Recipe generation applications, such as IBM's Chef Watson™ (Chef Watson and all Chef Watson-based trademarks and logos are trademarks or registered trademarks of International Business Machines Corporation and/or its affiliates), may generate recommended recipes to a user based on inputs such as ingredients, dishes, food types, allergies, etc. entered by the user into a user interface (UI) or graphical user interface (GUI). An application or computer program may automatically extract food related information from a literary work or a food-time-place-character combination from the literary work, and then generate a recipe based on a predictive model for the user using the food-time-place-character combination extracted from the literary work. The predictive model may depend on known statistical analysis techniques that can accept user input (e.g., ingredients, dishes, food types, allergies, etc.) and then output recipes based on parameters (e.g., historical data, known ingredients, recipes, etc.).

As previously described, natural language processing (NLP) tends to focus on the interactions between computer systems and human languages. Many modern NLP algorithms are derived based on machine learning and rely heavily on statistical inferences. By analyzing a large set of real-world examples of natural language usage, a computer system may be able to glean sets of rules that guide the machine through future analysis of natural language passages.

The NLP system may create a corpus of recipes with timestamps and geographic tags. The NLP system may then scan cookbooks and parse online sources (e.g., cooking newspaper articles, cooking blogs, etc.). Cookbooks may typically contain a date and location of publication. Moreover, known text analytics techniques can also help understand the time period and region of the cookbook when the date and location of publication may not be explicitly specified. Once the geographic and publication date information is determined, the NLP system may then ingest cookbook recipes. The NLP system may then create an ontology of ingredients and dishes and then may organize the ingredients and dishes by personality traits of a user. The user may have their personality determined by a cognitive application, such as Watson Personality Insights. Watson Personality Insights may extract and analyze a spectrum of personality attributes to help discover actionable insights about people and entities. The NLP system module may also scan food blogs on the Internet, and map ingredients and dishes to the personality traits of the user. The above described mapping of the ingredients and dishes to the personality traits of the user can be created by analyzing the usage of Chef Watson by the user. The mapping can include scanning generated recipes and user comments within Chef Watson.

According to at least one embodiment, the NLP system may extract meal themes from a literary work, and then create recipes according to the extracted meal theme. For example, a meal theme within Harry Potter® may be extracted, then the NLP system may generate recipes based on the meal theme. The recipes may extract ingredients mentioned in Harry Potter® that relate to the meal theme. Furthermore, the NLP system may be used in conjunction with writing an article. For example, authors of food-related articles may also generate novel, interesting recipes to complement the food-related article.

The NLP system may also scan the Internet for food-related information and receive electronic documents that include food-related information. The NLP system may then ingest the food-related information and create a corpus of recipes, where each recipe may be tagged with time and location information (e.g., timestamps and geographic tags). The NLP system may then parse a given literary work to identify food-time-place-character combinations as well as character personalities, and then generate novel recipes for one or more of these combinations. For example, the NLP system may parse Harry Potter® and then identify a food-time-place-character combination to be Dragon Stew-First Year-Diagon Alley®-Hermione Granger®. The NLP system may then create a recipe using known ingredients and cooking techniques from the corpus of recipes that most closely match the identified food-time-place-character combination identified in Harry Potter®.

The NLP system may also identify characters in the literary work and some of their cultural background (e.g., upper class vs. middle class) and demographic attributes within the literary work. The NLP system may then create personality profiles for the characters and identify food-related information (e.g., food names, dish names, etc.) and their context (e.g., relationship to time, place, and characters) within the literary work. The NLP system may evaluate passages that describe particular foods or meals associated with characters for sentiment or negation (e.g., whether the character likes or dislikes a particular food). The NLP system may then generate a predictive model of food-time-place-character combinations found in the text, and then let the user choose the combination needed to create a recipe. The NLP system may also expand on food-related information using the recipe corpus. The NLP system may then look up the dishes and ingredients mentioned in the literary work to identify candidate recipes and a set of candidate ingredients to utilize when generating a recipe. The NLP system may also complement known ingredients and dishes that match the character's personality.

Referring now to FIG. 1, a block diagram of an example computing environment 100 in which illustrative embodiments of the present disclosure may be implemented is provided. As discussed above, aspects of the disclosure may relate to NLP. Accordingly, an understanding of the embodiments of the present disclosure may be aided by describing embodiments of NLP systems and the environments in which these systems may operate. The computing environment 100 may include two remote devices 102 and 112 and a host device 122.

The host device 122 and the remote devices 102 and 112 may be computer systems. The remote devices 102 and 112 and the host device 122 may include one or more processors 106, 116, and 126 and one or more memories 108, 118, and 128, respectively. The remote devices 102 and 112 and the host device 122 may be configured to communicate with each other through an internal or external network interface 104, 114, and 124. The network interfaces 104, 114, and 124 may be modems or network interface cards. The remote devices 102 and 112 and/or the host device 122 may be equipped with a display or monitor. Additionally, the remote devices 102 and 112 and/or the host device 122 may include optional input devices (e.g., a keyboard, mouse, scanner, or other input device), and/or any commercially available or custom software (e.g., browser software, communications software, server software, NLP software, search engine and/or web crawling software, filter modules for filtering content based upon predefined parameters, etc.). Furthermore, the remote devices 102 and 112 and/or the host device 122 may be servers, desktops, laptops, or hand-held devices.

The remote devices 102 and 112 and the host device 122 may be distant from each other and communicate over a network 150. The host device 122 may be a central hub from which remote devices 102 and 112 can establish a communication connection, such as in a client-server networking model. Alternatively, the host device 122 and remote devices 102 and 112 may be configured in any other suitable networking relationship (e.g., in a peer-to-peer configuration or using any other network topology).

The network 150 can be implemented using any number of any suitable communications media. For example, the network 150 may be a wide area network (WAN), a local area network (LAN), the Internet, or an intranet. The remote devices 102 and 112 and the host device 122 may be local to each other, and communicate via any appropriate local communication medium. For example, the remote devices 102 and 112 and the host device 122 may communicate using a local area network (LAN), one or more hardwire connections, a wireless link or router, or an intranet. Furthermore, the remote devices 102 and 112 and the host device 122 may be communicatively coupled using a combination of one or more networks and/or one or more local connections. For example, the first remote device 102 may be hardwired to the host device 122 (e.g., connected with an Ethernet cable) while the second remote device 112 may communicate with the host device 122 using the network 150 (e.g., over the Internet).

Additionally, the network 150 can be implemented within a cloud computing environment, or using one or more cloud computing services. Consistent with various embodiments, a cloud computing environment may include a network-based, distributed data processing system that provides one or more cloud computing services. Furthermore, a cloud computing environment may include many computers (e.g., hundreds or thousands of computers or more) disposed within one or more data centers and configured to share resources over the network 150. The network 150 may include connections, such as wire, wireless communication links, or fiber optic cables.

The remote device 102 may enable users to submit (or may submit automatically with or without user input) electronic documents (e.g., novels, journal articles, and other literary works) to the host device 122. The electronic documents can be formatted in various ways including text, image, audio, and video. For example, the remote device 102 may include an electronic document submission module 110 and a UI. The electronic document submission module 110 may be in the form of a web browser or any other suitable software module, and the UI may be any type of interface (e.g., command line prompts, menu screens, graphical user interfaces). The UI may allow a user to interact with the remote device 102 to submit, using the document submission module 110, literary works (including novels and journal articles) to the host device 122. As will be discussed with reference to FIG. 5, host device 122 may include internal components 902a and external components 904a, respectively, and remote devices 102 and 112 may include internal components 902b and external components 904b, respectively.

The remote device 112 may include a web crawler module 120 that enables a user to search (or may search automatically with or without user input) for web pages having particular food-related content (e.g., recipes, message threads, blog posts, and user comments) and that further enables providing the food-related content to the host device 122. Additionally, the web crawler module 120 can enable a user to search (or may search automatically with or without user input) for other electronic communications (e.g., text messages, instant messages, or emails that are isolated or are grouped together such that a group of related electronic communications between multiple parties are together considered one electronic communication).

The host device 122 may include an NLP system 132. The NLP system 132 may include a natural language processor 134, a comparator module 136, and a recipe generator module 138. The natural language processor 134 may include numerous subcomponents, such as a tokenizer, a part-of-speech (POS) tagger, a semantic relationship identifier, and a syntactic relationship identifier. An example natural language processor and subcomponents are discussed in more detail in reference to FIG. 2. The natural language processor 134 may be configured to perform NLP to ingest a literary work (e.g., a literary work submitted by remote device 102) and/or to ingest content displayed on web page or other electronic communication (e.g., content submitted by remote device 112).

The comparator module 136 may be implemented using a conventional or other search engine, and may be distributed across multiple computer systems. The comparator module 136 may be configured to search one or more databases or other computer systems for content ingested by the natural language processor 134. For example, the comparator module 136 may be configured to compare ingested content displayed on food related web pages or other electronic communications (and received from the web crawler module 120) in order to help identify food-related content that is relevant to ingested content of the literary work (received from the document submission module 110).

The recipe generator module 138 may be configured to analyze a literary work and to generate recipes based on user input associated with the literary work. The recipe generator module 138 may include one or more modules or units, and may utilize the comparator module 136, to perform its functions (e.g., to determine a relationship/relatedness score between food related content of a literary work and content (e.g., ingredients) from a corpus of recipes), as will be discussed in more detail in reference to FIGS. 2 and 4.

While FIG. 1 illustrates a computing environment 100 with a single host device 122 and two remote devices 102 and 112, suitable computing environments for implementing embodiments of this disclosure may include any number of remote devices and host devices. The various models, modules, systems, and components illustrated in FIG. 1 may exist, if at all, across a plurality of host devices 122 and remote devices 102 and 112. For example, some embodiments may include two host devices 122. The two remote devices 102 and 112 may be communicatively coupled using any suitable communications connection (e.g., using a WAN, a LAN, a wired connection, an intranet, or the Internet). The host device 122 may include an NLP system configured to receive and analyze content from a web page or other electronic communication, and the host device 122 may also include an NLP system configured to receive and analyze a literary work.

It is noted that FIG. 1 is intended to depict the representative major components of an exemplary computing environment 100. However, individual components may have greater or lesser complexity than as represented in FIG. 1, components other than or in addition to those shown in FIG. 1 may be present, and the number, type, and configuration of such components may vary. It should be appreciated that FIG. 1 provides only an illustration of one implementation and does not imply any limitations with regard to the environments in which different embodiments may be implemented. Many modifications to the depicted environments may be made based on design and implementation requirements.

Figure 2:
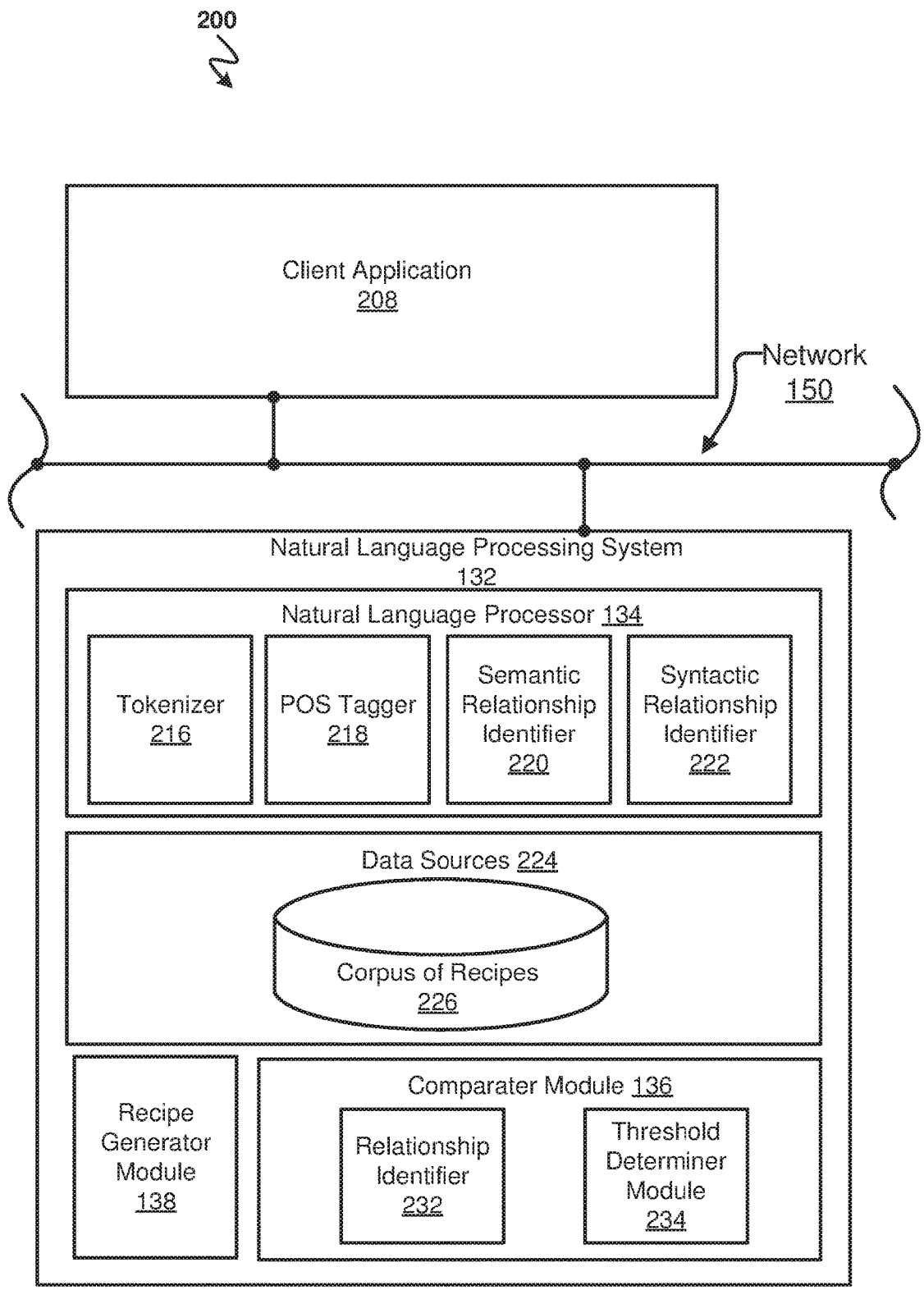
FIG. 2 illustrates a block diagram of an exemplary system architecture configured to ingest a literary work and generate a recipe according to at least one embodiment.

Referring now to FIG. 2, shown is a block diagram of an exemplary system architecture 200, including an NLP system 132, configured to ingest a literary work and generate a recipe, in accordance with embodiments of the present disclosure. A first remote device 102 (FIG. 1) may submit electronic documents (e.g., an electronic copy of a novel) to be analyzed by the NLP system 132 which may be housed on a host device 122 (FIG. 1). A second remote device 112 (FIG. 1) may submit other electronic content (e.g., content displayed on a web page) to be analyzed by the NLP system 132. Such remote devices 102 and 112 (FIG. 1) may each include a client application 208, which may itself involve one or more entities operable to generate or modify content from a literary work or a web page or other electronic communication that is then dispatched to an NLP system 132 via a network 150. A user may download the client application from the Internet and then interact with the client application 208 to generate a recipe. For example, the client application 208 may be a software program that includes functionality to generate the recipe when working in conjunction with the NLP system 132. Furthermore, the client application 208 may be integrated into the remote devices 102 and 112 (FIG. 1) and the host device 122 (FIG. 1).

The NLP system 132 may respond to content submissions sent by a client application 208. Specifically, the NLP system 132 may analyze a received literary work, received web page, received article content, or other received electronic communication content to identify characteristics about the received content (e.g., a meal theme, main idea, and/or characters). The NLP system 132 may include a natural language processor 134, data sources 224, and a comparator module 136. The natural language processor 134 may be a computer module that analyzes the received content. The natural language processor 134 may perform various methods and techniques for analyzing the received content (e.g., syntactic analysis, semantic analysis, etc.). The natural language processor 134 may be configured to recognize and analyze any number of natural languages. Moreover, the natural language processor 134 may parse passages of the received content. Furthermore, the natural language processor 134 may include various modules to perform analyses of electronic documents. These various modules may include, but are not limited to, a tokenizer 216, a part-of-speech (POS) tagger 218, a semantic relationship identifier 220, and a syntactic relationship identifier 222.

The tokenizer 216 may be a computer module that performs lexical analysis, which is the analysis of a vocabulary of a language (e.g., Russian, English, or French). The tokenizer 216 may convert a sequence of characters into a sequence of tokens. A token may be a string of characters included in written passage and categorized as a meaningful symbol. Additionally, the tokenizer 216 may identify word boundaries in content and break any text passages within the content into their component text elements, such as words, multiword tokens, numbers, and punctuation marks. The tokenizer 216 may receive a string of characters, identify the lexemes in the string, and then categorize them into tokens.

The POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. The context of a word may be dependent on one or more previously analyzed content (e.g., the content of one novel may shed light on the meaning of text elements in related novel, or content of a first comment by a user on a food related web page may shed light on meaning of text elements of a second comment by that user on the same or different web page). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. Furthermore, the POS tagger 218 may tag or otherwise annotate tokens of a passage with part of speech categories. The POS tagger 218 may tag tokens or words of a passage to be parsed by the NLP system 132.

The semantic relationship identifier 220 may be a computer module that may be configured to identify semantic relationships of recognized text elements (e.g., words, phrases) in received content. The semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences, for example, which groups of words are associated as phrases and which word is the subject or object of a verb. The syntactic relationship identifier 222 may conform to formal grammar.

The natural language processor 134 may be a computer module that may parse received content and generate corresponding data structures for one or more portions of the received content. For example, in response to receiving a literary work at the NLP system 132, the natural language processor 134 may output parsed text elements from the literary work as data structures. A parsed text element may be represented in the form of a parse tree or other graph structure. To generate the parsed text element, the natural language processor 134 may trigger computer modules 216-222.

The output of natural language processor 134 (e.g., ingested content) may be stored within data sources 224, such as corpus of recipes 226. The corpus of recipes 226 may include ingested recipes, cookbooks, food-related web pages, and other food-related electronic documents. As used herein, a corpus may refer to one or more data sources, such as the data sources 224. The data sources 224 may include data warehouses, corpora, data models, and document repositories. Furthermore, the corpus of recipes 226 may be a relational database.

The comparator module 136 may be a computer module that compares ingested content of one or more recipes to ingested content of a literary work or other electronic communication. Furthermore, the comparator module 136 may include a relationship identifier 232 and a threshold determiner module 234. The threshold determiner module 234 may identify a relationship between the ingested content of the one or more recipes and the ingested content of a particular work of authorship or other electronic communication. This may be done by searching the ingested content of the one or more recipes for semantic similarities and conceptual overlaps with ingested content of the literary work or other electronic communication. Certain similarities between the two sets of ingested content may be weighted more heavily than others. For example, titles are often described by their relation to the main meal idea of the literary work, web page, or cookbook, or other electronic communication, and, therefore, similar titles may indicate a relationship.

The relationship identifier 232 may first identify a main meal idea within the ingested content of the literary work, and then the relationship identifier 232 may search the ingested content of the corpus of recipes 226, a personality profile of a user, or other electronic communication for substantially similar content. Such similar content may include words or phrases indicating meals, food, date, characters, or words that are related to content within the literary work. Furthermore, the recipe generator module 138 may replace foods and meals with substantially similar foods or meals. For example, the recipe generator module 138 may replace pinto beans with kidney beans. For example, the recipe generator module 138 may replace beef or other meat with tofu, if the user is a vegetarian. Additionally, in order to identify literary work content or other electronic communication content associated with one or more main meal ideas of the literary work, the relationship identifier 232 may search the corpus of recipes 226 for related concepts.

After the relationship identifier 232 identifies a relationship between the ingested content of the literary work and the ingested content of the corpus of recipes 226 or other electronic communication, the threshold determiner module 234 may be configured to determine if the relatedness score satisfies a threshold. The relatedness score may be evaluated based on a set of relatedness criteria in order to determine whether or not the relatedness score satisfies the threshold. The relatedness criteria may include parameters based on a personality profile of the user. For example, the parameters may withhold peanuts or meat from being included in a generated recipe, if the user has a peanut allergy or is a vegetarian, respectively.

Figure 3:
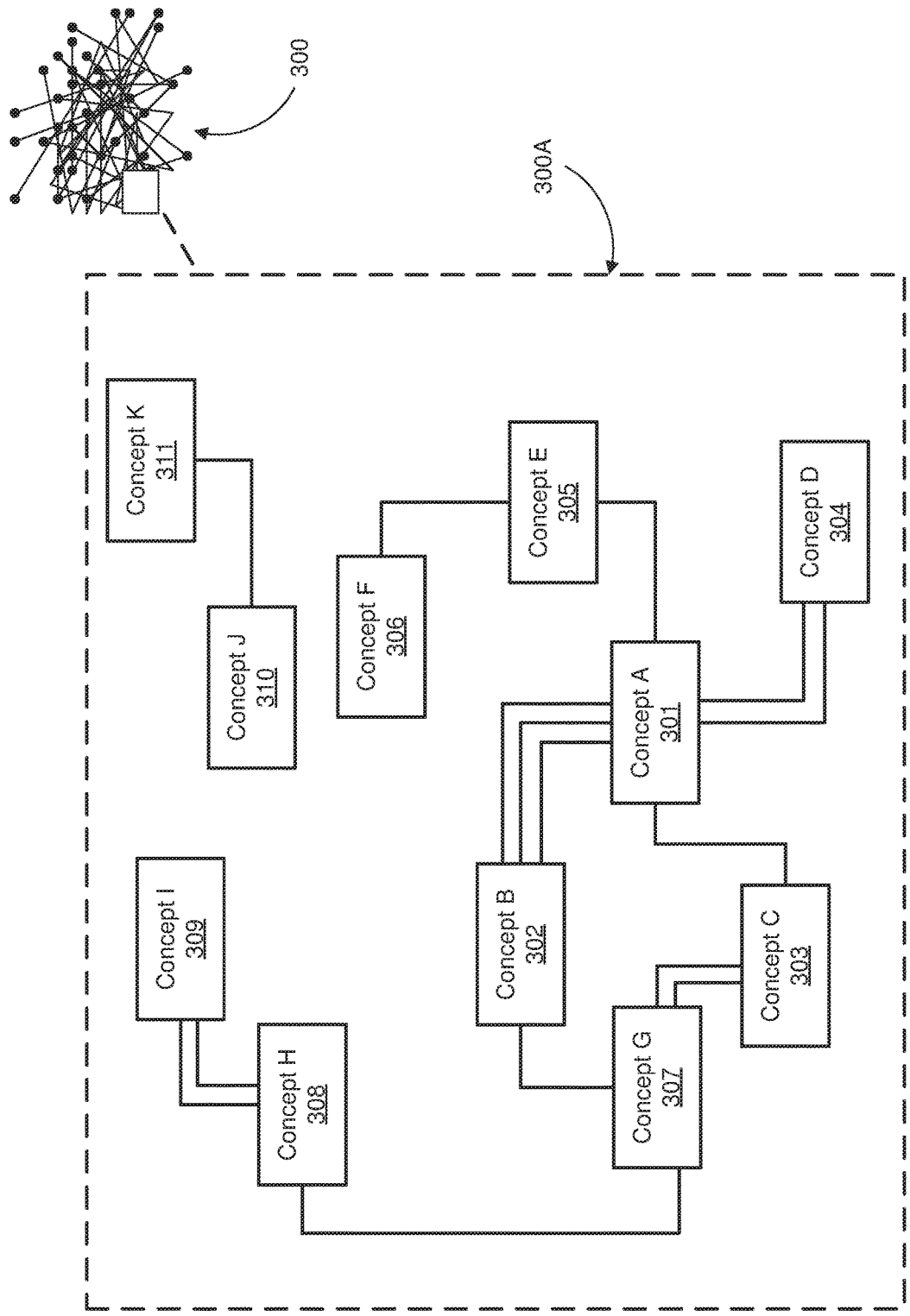
FIG. 3 illustrates a close-up view of a portion an exemplary knowledge graph for a work of authorship according to at least one embodiment.

FIG. 3 illustrates a close-up view of a portion 300A of an exemplary knowledge graph 300 for a literary work, in accordance with embodiments of the present disclosure. The close-up view of the portion 300A includes eleven nodes 301-311, with each node representing a different concept. For example, a node may represent a food-time-place-character combination or a food, time, place, or character described in one or more ingested works of literature. For example, a node may represent Harry Potter™, Dragon Stew, or ingredients described in Harry Potter™ of a recipe for Dragon Stew. The nodes 301-311 are connected by edges that represent connections between the concepts. For example, if two connected concepts correspond to a Harry Potter™ and Dragon Stew or another meal described in Harry Potter™, an edge connecting them may represent a link for Harry Potter™ eating Dragon Stew. The NLP system 132 (FIG. 1) may generate the knowledge graph 300 using known natural language processing techniques. The illustrated portion 300A of the knowledge graph 300 is an undirected part of the knowledge graph, meaning that the edges shown represent symmetric relations between the concepts. If, however, the edge represented a different relationship, the edge may be a directed edge.

The number of edges connecting two concepts may correspond to a level of relatedness between the concepts. For example, concept A 301, which may correspond to Dragon Stew, and concept B 302, which may correspond to a first ingredient of a recipe used for Dragon Stew (e.g., pepper), are connected with three edges, whereas concept A 301 is connected to concept E 305, which may correspond to a second ingredient of the recipe used for Dragon Stew (e.g., salt), by a single edge. This may indicate that concept A 301 and concept B 302 are more closely related than concept A 301 and concept E 305. As an additional example, concept C 303 may correspond to a food-time-place-character combination (e.g., Dragon Stew-second year-Diagon Alley®-Harry Potter™) and concept G 307 may correspond to a third ingredient used in a recipe for Dragon Stew with respect for that particular food-time-place-character combination, and are connected with two edges. The two edges between concept C 303 and concept G 307 may represent two instances when the third ingredient was referenced in connection with the particular food-time-place-character combination, Dragon Stew-second year-Diagon Alley®-Harry Potter™. The relationship identifier 232 (FIG. 2) may generate a relatedness score for two concepts using the number of edges connecting the two concepts together as will be discussed in FIG. 4.

The relatedness score may also consider the relatedness of concepts that, while not directly connected to each other in the knowledge graph 300, are each connected to the same concept. The NLP system 132 (FIG. 1) may look at whether a food-time-place-character combination can be taken through other concepts to connect the two concepts. For example, a food-time-place-character combination can be drawn to connect concept A 301 and concept F, which may correspond to a time (such as when Harry Potter™ was in his third year in school), 306 by going through concept E 305, which may correspond to a favorite food of Harry Potter™ while he was in his third year in school. The length of the path may be considered when determining a relatedness score between two concepts. For example, the relatedness score may be based on the degrees of separation between concepts. Two concepts that are linked together (e.g., concept A 301 and concept B 302) may have 1 degree of separation, whereas two concepts that are not linked together but are both linked to a third concept (e.g., concept A 301 and concept F 306) may have 2 degrees of separation, for example.

The NLP system 132 (FIG. 1) may also consider the number of other concepts that the two concepts are connected to in determining a relatedness score. For example, concept G 307 is not connected by an edge to concept A 301. However, concept G 307 and concept A 301 are both connected to concepts C 303 and B 302. The NLP system 132 (FIG. 1) may determine that, despite not being directly connected, concepts G 307 and A 301 are somewhat related. Accordingly, the relatedness score between concepts G 307 and A 301 may be higher than the relatedness score between concept A 301 and concept I 309, which are distantly connected to each other, or than concept A 301 and concept K 311, which cannot be connected.

The illustrated portion 300A of the knowledge graph 300 has two connected components. A connected component of an undirected graph includes a subgraph in which any two nodes in the subgraph are connected to each other by paths (including paths through other nodes), but cannot be connected to at least one other node in the graph. For example, concept K 311 and concept J 310 are connected to each other, but no path exists in the illustrated portion 300A of the knowledge graph 300 that can connect either concept K 311 or concept J 310 to concept I 309. Likewise, any two nodes that represent concepts A through I 301-309 can be connected to each other by at least one path, but none of the nodes representing concepts A through I 301-309 can be connected to either concept J 310 or concept K 311. Because there are two subgraphs that satisfy this criteria, the illustrated portion 300A of the knowledge graph 300 includes two connected components.

The knowledge graph 300 (or a portion thereof) may have an isolated node. An isolated node includes a node relating to a concept that does not connect to any other nodes through an edge. Isolated nodes may be particularly likely to exist in knowledge graphs generated for a character mentioned only briefly. An isolated node is a type of connected component.

The nodes 301-311 may be generated using "fuzzy logic" and/or concept matching, which may be done to ensure that different words or phrases relating to the same concept are included in a single node (e.g., if a character's name changes throughout the book). Fuzzy logic is a technique that may represent different representations of a name or concept as a same entity. For example, a book may refer to a character's "name," "Harry Potter™," and "Mudblood" at different points. An NLP system 132 (FIG. 1) using natural language processing techniques and fuzzy logic may determine that all three words refer to the same concept. Accordingly, all three terms may be represented in the knowledge graph using a single node and any edges between any of the three terms and other concepts may connect to that node.

The nodes 301-311 can be weighted according to their importance. This may be represented in the knowledge graph 300 by making the nodes 301-311 larger or smaller. The nodes 301-311 may be weighted according to the number of edges that connect to the nodes. The nodes 301-311 may be weighted according to the importance of the associated concept. For example, concepts relating to food ingredients of a recipe for Dragon Stew (e.g., rice, pepper, and ranch dressing) may be weighted less than concepts relating to events (e.g., a wedding or a battle). Also, ingredients previously used by the user may be weighted more heavily. Conversely, ingredients that the user is allergic to may be weighted less heavily.

One or more of the nodes 301-311 may be considered potentially important nodes. This may be represented in the knowledge graph by making the potentially important nodes larger, smaller, or boldface type. A node may be a potentially important node if it has a high number of edges connecting to it. For example, the NLP system 132 (FIG. 1) may determine that a node is a potentially important node by comparing the number of edges connected to the node to an important node threshold. The important node threshold may be configured by a user. The important node threshold may be determined by the NLP system 132 (FIG. 1) based on the number of edges connected to each node. For example, the NLP system 132 (FIG. 1) may determine that 10% of nodes in the knowledge graph have more than 20 edges connected to them. Accordingly, the NLP system 132 (FIG. 1) may set the important node threshold at 20 edges. Therefore, any node with more than 20 connected edges may be considered a potentially important node.

Figure 4:
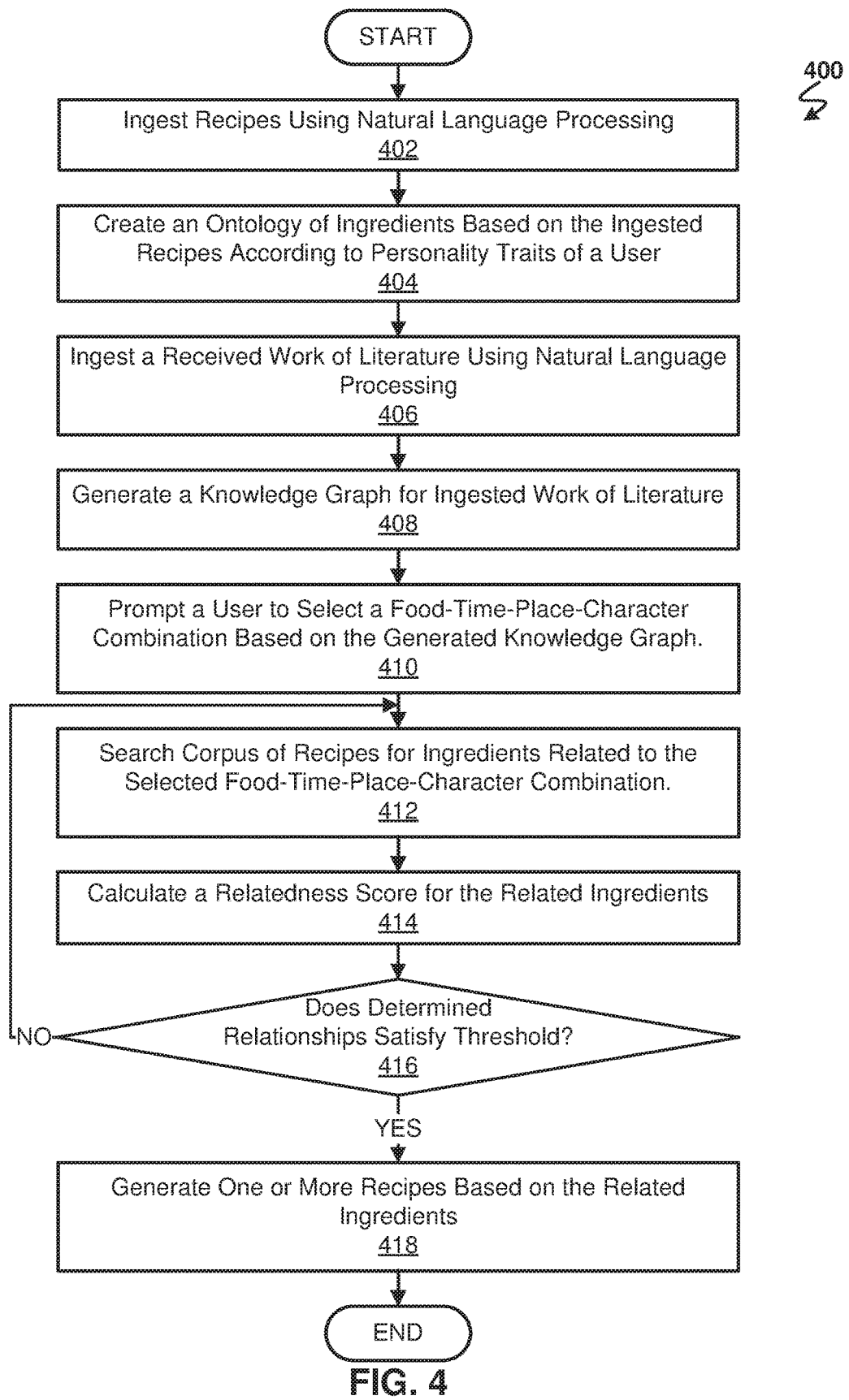
FIG. 4 an operational flowchart illustrating a recipe generation process according to at least one embodiment.

Referring now to FIG. 4, an operational flowchart illustrating a recipe generation process 400 according to at least one embodiment is depicted. The operations of the recipe generation process 400 may be performed by the NLP system 132 (FIG. 1) and the various subcomponents of the NLP system 132 (FIG. 1). At 402, the natural language processor 134 (FIG. 1) ingests one or more recipes using NLP. NLP, as discussed herein, may incorporate any relevant natural processing techniques including, without limitation, those techniques discussed in reference to modules 216-222 (FIG. 2). The ingesting can include analyzing and parsing the one or more recipes into basic syntactic and semantic components. The one or more recipes may be a printed publication (e.g., a magazine article or novel) or an electronic document (e.g., audio, images, video, live video stream, or some combination thereof). The one or more recipes may be in a form of one or more languages. For example, the one or more recipes may be in any language or form of communication (e.g., Russian, English, Brail, or some combination thereof). Furthermore, the NLP technique may be configured to parse structured data (e.g., tables, graphs) and unstructured data (e.g., textual content containing words, numbers).

The NLP technique may be embodied in a software tool or other program (e.g., NLP system 132 (FIG. 1)) configured to analyze and identify the semantic and syntactic elements and relationships present in the one or more recipes. More particularly, the NLP technique can include parsing the grammatical constituents, parts of speech, context, and other relationships (e.g., modifiers) of the one or more recipes. The NLP technique can be configured to recognize keywords, contextual information, and metadata tags associated with words, phrases, or sentences related to concepts (e.g., date and/or location of publication, ingredients, ethnicity of recipes, etc.). The syntactic and semantic elements can include information, such as word frequency, word meanings, text font, italics, hyperlinks, proper names, noun phrases, parts-of-speech, or the context of surrounding words. Other syntactic and semantic elements are also possible. Additionally, each ingested recipe may be stored in the corpus of recipes 226 (FIG. 2).

Then, at 404, the natural language processor 134 (FIG. 1) creates an ontology of ingredients based on the ingested recipes according to personality traits of a user. The natural language processor 134 (FIG. 1) may sort the ingested recipes into categories based on types of ingredients (e.g., spices, meat, dressing, etc.). The natural language processor 134 (FIG. 1) may sort the recipes according to a personality profile of a user which may have been created by Watson Personality Insights, as previously described. For example, a personality profile may include food allergies (e.g., a peanut allergy), food preferences (e.g., protein focused or nutrition balanced diets for a body builder or certain ethnic cuisines), and/or lifestyle diets (e.g., vegetarian or organic). Sorting the recipes according to ingredients and a personality profile of a user can be useful for further determining context for a particular portion of an ingested literary work, as will be discussed in reference to step 406.

Next, at 406, the natural language processor 134 (FIG. 1) ingests a literary work using NLP. The natural language processor 134 (FIG. 1) may ingest the literary work in a substantially similar way as previously discussed at step 402. The ingesting can include analyzing and parsing the one or more literary works into basic syntactic and semantic components. The one or more literary works may be a printed publication (e.g., a magazine article or novel) or an electronic document (e.g., audio, images, video, live video stream, or some combination thereof). The one or more literary works may be in a form of one or more languages. For example, the one or more literary works may be in any language or form of communication (e.g., Russian, English, Brail, or some combination thereof). Furthermore, the NLP technique may be configured to parse structured data (e.g., tables, graphs) and unstructured data (e.g., textual content containing words, numbers).

Then, at 408, the natural language processor 134 (FIG. 1) generates a knowledge graph for the ingested literary work. The knowledge graph may have the same or similar characteristics and/or appearance as the knowledge graph 300 (FIG. 3). For example, the knowledge graph may include a plurality of nodes and edges. The nodes may relate to concepts found in the literary work, such as characters, meal-themes, and/or ingredients. The nodes may be linked together with edges to represent a connection between the nodes. For example, two concepts relating to a character and a restaurant or meal time (e.g., breakfast, lunch, and/or dinner) may be linked together with an edge that represents the character is eating lunch. Meal themes may also be represented by edges (e.g., an edge between two concepts may indicate that a character ate a burrito with certain ingredients for lunch).

The knowledge graph may be generated by parsing the book to identify subject-predicate-object triplets or food-time-place-character combinations. Identifying the subject-predicate-object triplets or food-time-place-character combinations may involve analyzing parse trees generated by a natural language processor 134 (FIG. 1). The subject and objects in the sentence may be represented by nodes in a knowledge graph, whereas the predicate may be represented by an edge. For example, a sentence in a book might read "Harry Potter® is a wizard who ate Dragon Stew in Diagon Alley® during his second year." For example, the natural language processor 134 (FIG. 1) may parse "Harry Potter® is a wizard who ate Dragon Stew in Diagon Alley® during his second year" to identify a food ("Dragon Stew"), a time ("second year"), a place ("Diagon Alley®"), and a character ("Harry Potter®"). Based on the parsing, the natural language processor 134 (FIG. 1) may generate nodes for "Harry Potter®" and "Dragon Stew." The nodes may be connected by an edge denoting a relationship between the nodes (i.e., indicating that Harry Potter® is eating Dragon Stew).

At 410, the natural language processor 134 (FIG. 1) prompts a user to select a food-time-place-character combination based on the generated knowledge graph. A list of food-time-place-character combinations may be displayed within any suitable user interface for allowing a user to select a food-time-place-character combination (e.g., a touch screen, tablet, etc.). For example, the UI may be a GUI or a command prompt. The user may select more than one food-time-place-character combination that the user may wish to generate a recipe. For example, a user may select two different food-time-place-character combinations from the literary work that the user may wish to generate a recipe for to use for a dessert and a main course. As another example, the user may select a character that the user is interested in basing a meal around, such as a meal in a specific location in the book.

Next, at 412, the comparator module 136 (FIG. 1) searches the corpus of recipes 226 (FIG. 2) for ingredients related to the selected food-time-place-character combination. The comparator module 136 (FIG. 1) may search for ingredients that are included in the personality profile of the user. For example, if the food-time-place-character combination selected is Dragon Stew-second year-Diagon Alley®-Harry Potter® and the knowledge graph determines that there are ingredients linked to Dragon Stew within the literary work, the natural language processor 134 (FIG. 1) may search for the linked ingredients. For example, if the ingredients for Dragon Stew are described in the literary work, the knowledge graph may represent each ingredient of Dragon Stew as a node (e.g., 301-310 (FIG. 3)) and each node may be connected to a node (e.g., 311 (FIG. 3)) that represents Dragon Stew. The searched ingredients may also include alternatives, such as vegetarian alternatives (e.g., tofu) to meat. The alternatives may also include ingredients frequently used by the user that may be stored in a data repository (e.g., memory 128 (FIG. 1)).

Then, at 414, the relationship identifier 232 (FIG. 2) calculates a relatedness score for the searched ingredients using the knowledge graph, as previously discussed in FIG. 3. The calculated relatedness score may be based on the relatedness between ingredients and food-time-place-character combination within the knowledge graph. The relationship identifier 232 (FIG. 2) may use a knowledge graph to calculate the relatedness score. Various aspects of the relatedness score were previously discussed in more detail and with examples in reference to FIG. 3.

The relatedness score may be based on the number of edges between the selected food-time-place-character combination and ingredients and/or meals within the corpus of recipes 226 (FIG. 2). The more edges that connect the selected food-time-place-character combination and ingredients and/or meals, the more closely related the selected food-time-place-character combination and ingredients and/or meals may be, and the higher the relatedness score may be. The relationship identifier 232 (FIG. 2) may also consider the degrees of separation between edges that are not directly connected when determining a relatedness score. The fewer degrees of separation between the selected food-time-place-character combination and ingredients and/or meals, the more closely related the food-time-place-character combination and ingredients and/or meals may be.

The total number of edges that a selected food-time-place-character combination connects to may impact the relatedness score. For example, the selected food-time-place-character combination that relates to generic entities or ingredients that may cause an allergic reaction, such as "Peanuts" or "Beer," may link to a large number of other foods listed in the personality profile as harmful to the user. The relationship identifier 232 (FIG. 2) may penalize the selected food-time-place-character combination when calculating the relatedness score when the harmful ingredients are linked to the food-time-place-character combination. The relationship identifier 232 (FIG. 2) may be configured to ignore harmful ingredients relating to food allergies of the user and may not consider the food allergies when determining whether an ingredient and/or meal may be related. Additionally, when a harmful ingredient is related, the comparator module 136 (FIG. 1) may find an alternative ingredient within the corpus of recipes 226 (FIG. 2), such as cashews in place of peanuts or tofu in place of beef. The relationship identifier 232 (FIG. 2) may then retain the relatedness score for the harmful ingredient when an alternative is found within the corpus of recipes 226 (FIG. 2).

At 416, the threshold determiner module 234 (FIG. 2) determines if the calculated relatedness score satisfies a threshold. According to at least one embodiment, the recipe generation process 400 may continue along the operational flowchart if the relatedness score satisfies a threshold. If the threshold determiner module 234 (FIG. 2) determines the relatedness score satisfies the threshold (step 416, "YES" branch), the recipe generation process 400 may continue to generate one or more recipes based on the related ingredients at step 418. If the threshold determiner module 234 (FIG. 2) determines the relatedness score does not satisfy the threshold (step 416, "NO" branch), the recipe generation process 400 may return to step 412 to search the corpus of recipes 226 (FIG. 2) for other ingredients related to the selected food-time-place-character combination. The recipe generation process 400 may repeatedly return to step 412 from step 416 to search the corpus of recipes 226 (FIG. 2) for other ingredients related to the selected food-time-place-character combination until there are no more related ingredients. When there are no more related ingredients, the natural language processor 134 (FIG. 1) may find alternatives or the recipe generation process 400 may display a message within the UI that a recipe may not be generated for the selected food-time-place-character combination or the recipe generation process may continue to generate a recipe without one or more related ingredient.

The threshold may be the minimum relatedness score that an ingredient must achieve in order for the threshold determiner module 234 (FIG. 2) to determine that the searched ingredient is closely (aka intricately) related to the food-time-place-character combination. Ingredients with a lower score may not be related enough to the food-time-place-character combination, for example, if the ingredient is kidney beans but pinto beans would be more closely related to the food (e.g., nachos). Ingredients with a relatedness score exceeding the threshold may be important to the food-time-place-character combination, as well as a frequently used ingredient by the user. The threshold may be set by a user or system administrator. Additionally, the threshold may be set automatically by the natural language processor 134 (FIG. 1) based on historical data (e.g., frequently used ingredients by the user) stored in the memory 128 (FIG. 1). For example, if a user consistently selects a certain food that includes certain ingredients, the natural language processor 134 (FIG. 1) may adjust the threshold so that those certain ingredients have a lower threshold.

If the threshold determiner module 234 (FIG. 2) determines the calculated relatedness score satisfies a threshold, then the recipe generator module 138 (FIG. 1) generates one or more recipes that include a portion of the related ingredients at step 418. The recipe generator module 138 (FIG. 1) may generate the one or more recipes based on a predictive model that relies on historical data of past recipes selected by the user. The historical data may be stored in the memory 128 (FIG. 1). The one or more recipes may be displayed within the UI or GUI. The UI may be touch activated and/or voice activated. The one or more recipes may be displayed along with cooking instructions that may be adjusted according to the historical data or a user preference. For example, the user may input preferences of how the user may want meat prepared (e.g., medium rare) or vegetables cooked. The preferences may be stored in the memory 128 (FIG. 1) to be used for recipes generated in the future.

It may be appreciated that FIGS. 2, 3, and 4 provide only an illustration of one embodiment and do not imply any limitations with regard to how different embodiments may be implemented. Many modifications to the depicted embodiment(s) may be made based on design and implementation requirements.

Figure 5:
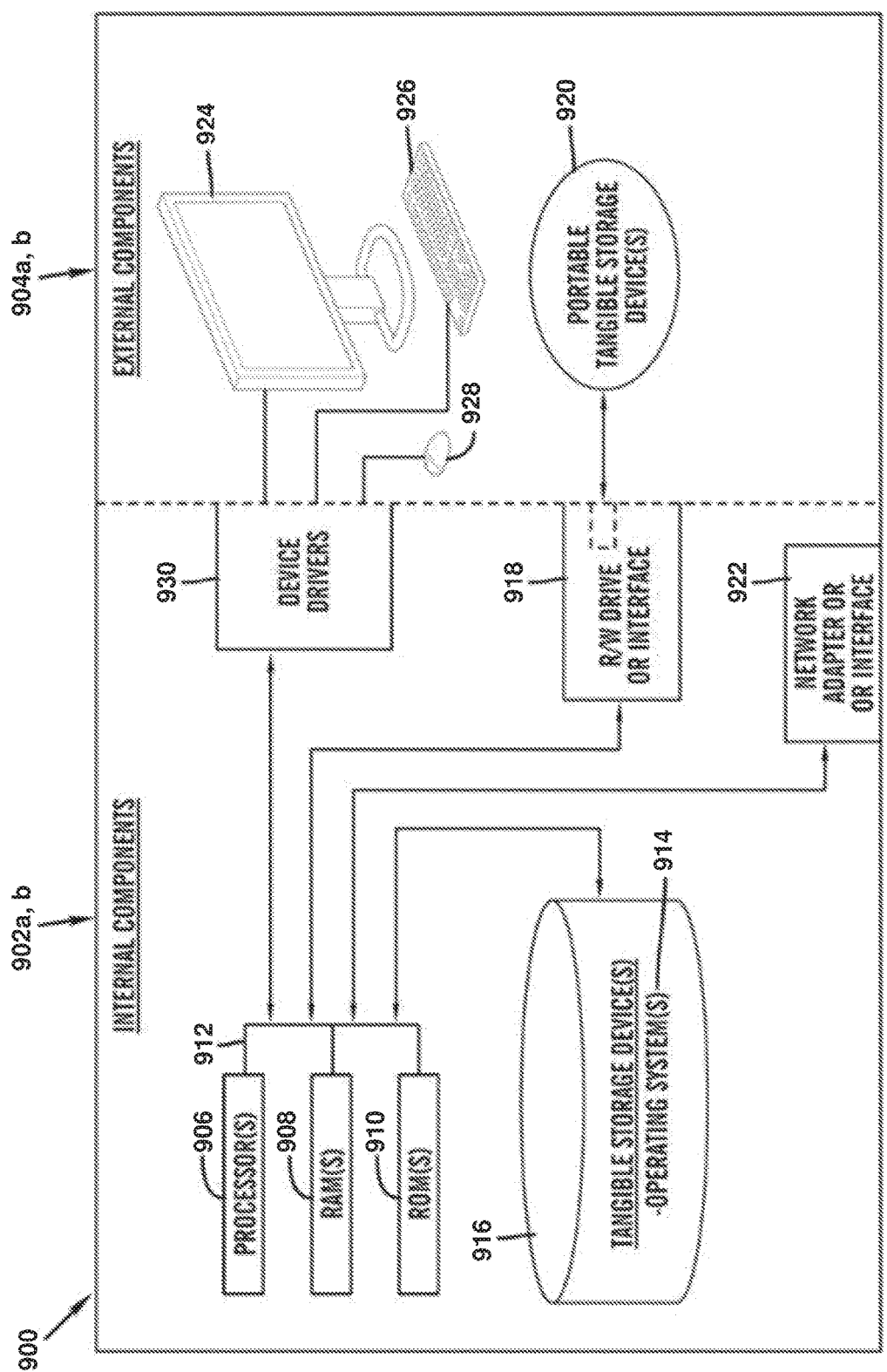
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Remote devices 102 and 112 (FIG. 1), and host device 122 (FIG. 1) may include respective sets of internal components 902 a, b and external components 904 a, b illustrated in FIG. 5. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the client application 208 (FIG. 2) may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the client application 208 (FIG. 2) can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The client application 208 (FIG. 2) can be downloaded from an external computer (e.g., server) via a network (for example, the Internet, a local area network or other, wide area network) and respective network adapters or interfaces 922. From the network adapters (or switch port adaptors) or interfaces 922, the client application 208 (FIG. 2) is loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
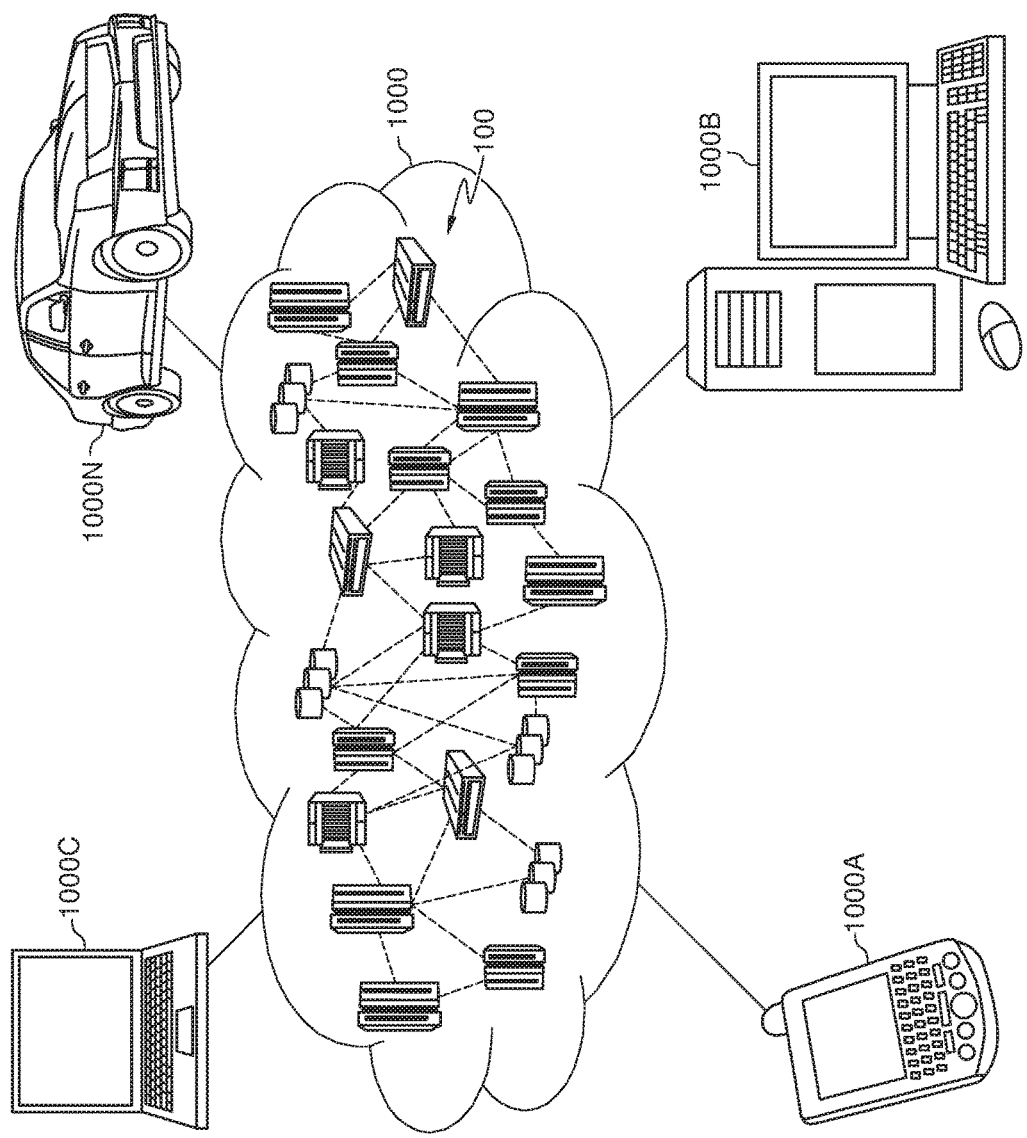
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
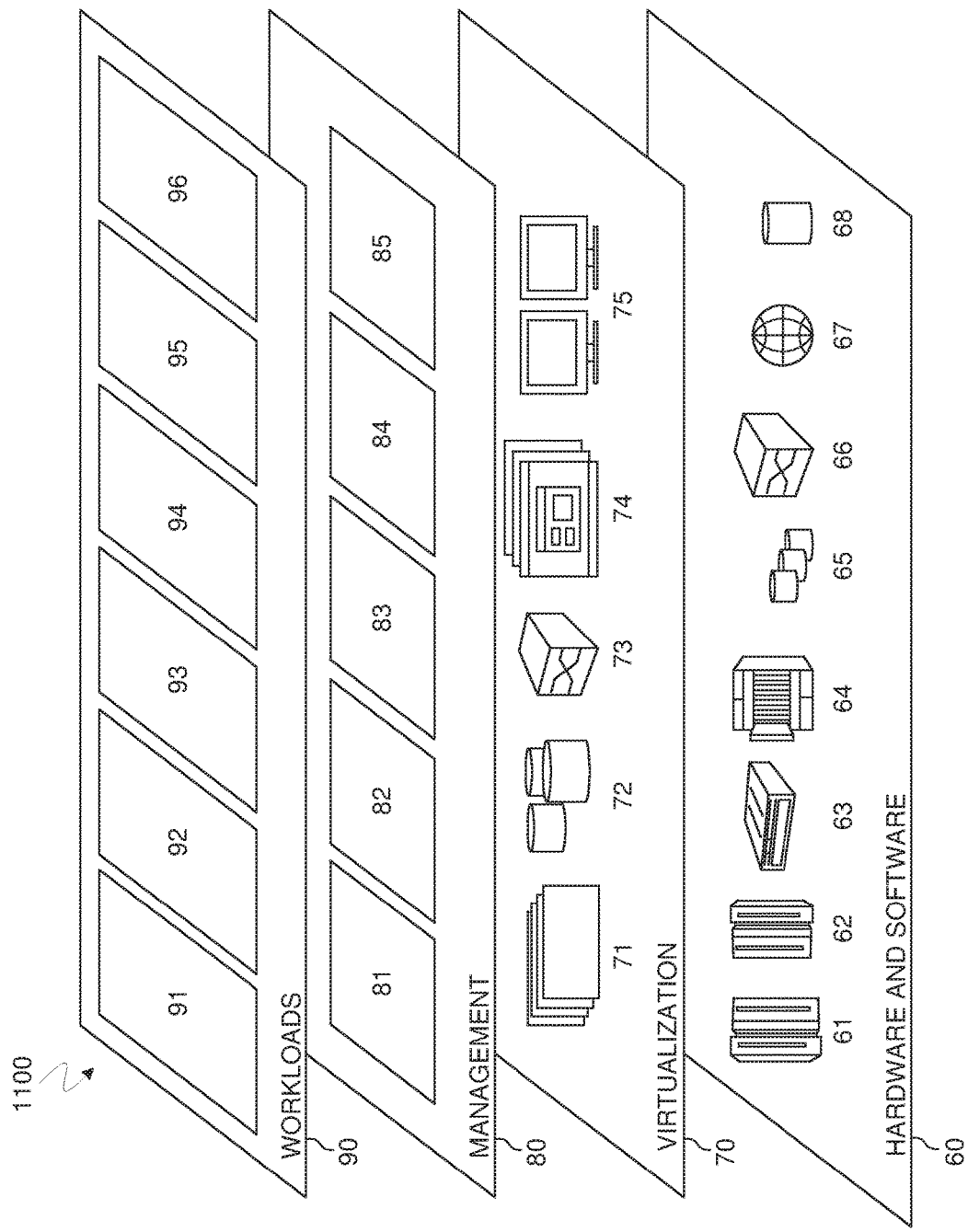
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recipe generation 96. Recipe generation 96 generates one or more recipes for a user based on a relatedness score between a selected food-time-place-character combination and related ingredients satisfying a threshold. The food-time-place-character combination may have been generated utilizing a knowledge graph representing interrelated concepts (e.g., meal themes) within an ingested literary work. The related ingredients may have been stored within a corpus of recipes 226 (FIG. 2) that includes one or more ingested food related electronic documents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a recipe from a literary work, the method comprising:
    ingesting, by a processor, a plurality of recipe content using a plurality of natural language processing (NLP) technology;
    creating an ingredient ontology based on the ingested plurality of recipe content;
    ingesting a plurality of content of the literary work using the plurality of NLP technology;
    generating a knowledge graph based on the ingested literary work, wherein the knowledge graph includes a first plurality of nodes representing a first plurality of concepts and a second plurality of nodes representing a second plurality of concepts, wherein edges between the first plurality of nodes and the second plurality of nodes represent links between the first plurality of concepts and the second plurality of concepts, wherein the first plurality of concepts is a plurality of food-time-place-character combinations and the second plurality of concepts is a first plurality of ingredients, wherein a generated knowledge graph generates the plurality of food-time-place-character combinations;

displaying the generated plurality of food-time-place-character combinations within a user interface;

prompting a user to select at least one of the plurality of food-time-place-character combinations;

calculating a relatedness score based on the number of edges between the first plurality of nodes and the second plurality of nodes; and generating a plurality of recipes based on the calculated relatedness score satisfying a predetermined threshold.

2. The method of claim 1, wherein the ingested plurality of recipe content are stored in a recipe corpus within an NLP system.

3. The method of claim 1, wherein the generated plurality of recipes are based on a selection made by a user of the at least one of the plurality of food-time-place-character combinations, and further comprising:

receiving the selection of the at least one food-time-place-character combination made by the user.

4. The method of claim 1, wherein the generated plurality of recipes are based on a plurality of historical data of a plurality of preferences associated with the user, wherein the plurality of historical data comprises a plurality of frequently used ingredients by the user.

5. The method of claim 3, further comprising:

determining the calculated relatedness score satisfies a threshold, wherein the threshold is predetermined;

comparing a second plurality of ingredients from the created ingredient ontology to the first plurality of ingredients; and replacing ingredients from the second plurality of ingredients with substantially similar ingredients from the first plurality of ingredients.

6. The method of claim 5, wherein the predetermined threshold is automatically adjusted based on a personality profile of the user.

7. A computer system for generating a recipe from a literary work, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

ingesting, by a processor, a plurality of recipe content using a plurality of natural language processing (NLP) technology;

creating an ingredient ontology based on the ingested plurality of recipe content;

ingesting a plurality of content of the literary work using the plurality of NLP technology;

generating a knowledge graph based on the ingested literary work, wherein the knowledge graph includes a first plurality of nodes representing a first plurality of concepts and a second plurality of nodes representing a second plurality of concepts, wherein edges between the first plurality of nodes and the second plurality of nodes represent links between the first plurality of concepts and the second plurality of concepts, wherein the first plurality of concepts is a plurality of food-time-place-character combinations and the second plurality of concepts is a first plurality of ingredients, wherein a generated knowledge graph generates the plurality of food-time-place-character combinations;

displaying the generated plurality of food-time-place-character combinations within a user interface;

prompting a user to select at least one of the plurality of food-time-place-character combinations;

calculating a relatedness score based on the number of edges between the first plurality of nodes and the second plurality of nodes; and generating a plurality of recipes based on the calculated relatedness score satisfying a predetermined threshold.

8. The computer system of claim 7, wherein the ingested plurality of recipe content are stored in a recipe corpus within an NLP system.

9. The computer system of claim 7, wherein the generated plurality of recipes are based on a selection made by a user of the at least one of the plurality of food-time-place-character combinations, and further comprising:

receiving the selection of the at least one food-time-place-character combination made by the user.

10. The computer system of claim 7, wherein the generated plurality of recipes are based on a plurality of historical data of a plurality of preferences associated with the user, wherein the plurality of historical data comprises a plurality of frequently used ingredients by the user.

11. The computer system of claim 9, further comprising:

determining the calculated relatedness score satisfies a threshold, wherein the threshold is predetermined;

comparing a second plurality of ingredients from the created ingredient ontology to the first plurality of ingredients; and replacing ingredients from the second plurality of ingredients with substantially similar ingredients from the first plurality of ingredients.

12. The computer system of claim 11, wherein the predetermined threshold is automatically adjusted based on a personality profile of the user.

13. A computer program product for generating a recipe from a literary work, comprising:

one or more computer-readable storage medium and program instructions stored on at least one of the one or more tangible storage medium, the program instructions executable by a processor, the program instructions comprising:

program instructions to ingest, by a processor, a plurality of recipe content using a plurality of natural language processing (NLP) technology;

program instructions to create an ingredient ontology based on the ingested plurality of recipe content;

program instructions to ingest a plurality of content of the literary work using the plurality of NLP technology;

program instructions to generate a knowledge graph based on the ingested literary work, wherein the knowledge graph includes a first plurality of nodes representing a first plurality of concepts and a second plurality of nodes representing a second plurality of concepts, wherein edges between the first plurality of nodes and the second plurality of nodes represent links between the first plurality of concepts and the second plurality of concepts, wherein the first plurality of concepts is a plurality of food-time-place-character combinations and the second plurality of concepts is a first plurality of ingredients, wherein a generated knowledge graph generates the plurality of food-time-place-character combinations;

program instructions to display the generated plurality of food-time-place-character combinations within a user interface;

program instructions to prompt a user to select at least one of the plurality of food-time-place-character combinations;

program instructions to calculate a relatedness score based on the number of edges between the first plurality of nodes and the second plurality of nodes; and program instructions to generate a plurality of recipes based on the calculated relatedness score satisfying a predetermined threshold.

14. The computer program product of claim 13, wherein the ingested plurality of recipe content are stored in a recipe corpus within an NLP system.

15. The computer program product of claim 13, wherein the generated plurality of recipes are based on a selection made by a user of the at least one of the plurality of food-time-place-character combinations, and further comprising:

program instructions to receive the selection of the at least one food-time-place-character combination made by the user.

16. The computer program product of claim 13, wherein the generated plurality of recipes are based on a plurality of historical data of a plurality of preferences associated with the user, wherein the plurality of historical data comprises a plurality of frequently used ingredients by the user.

17. The computer program product of claim 15, further comprising:

program instructions to determine the calculated relatedness score satisfies a threshold, wherein the threshold is predetermined, wherein the predetermined threshold is automatically adjusted based on a personality profile of the user;

program instructions to compare a second plurality of ingredients from the created ingredient ontology to the first plurality of ingredients; and program instructions to replace ingredients from the second plurality of ingredients with substantially similar ingredients from the first plurality of ingredients.

\* \* \* \* \*